Jan. 23, 1962      E. BULLIS, JR      3,018,342
CIRCUIT INTERRUPTING MEANS FOR A WIRING DEVICE
Filed Oct. 9, 1959      4 Sheets-Sheet 1

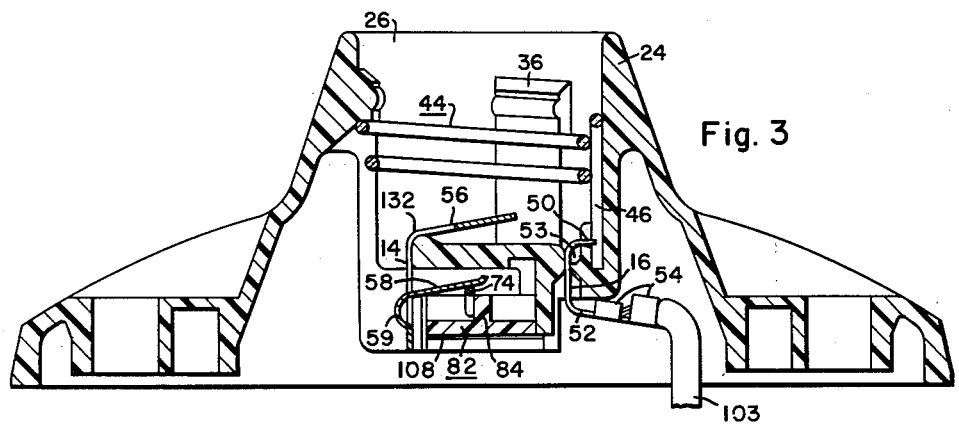
Fig. 3
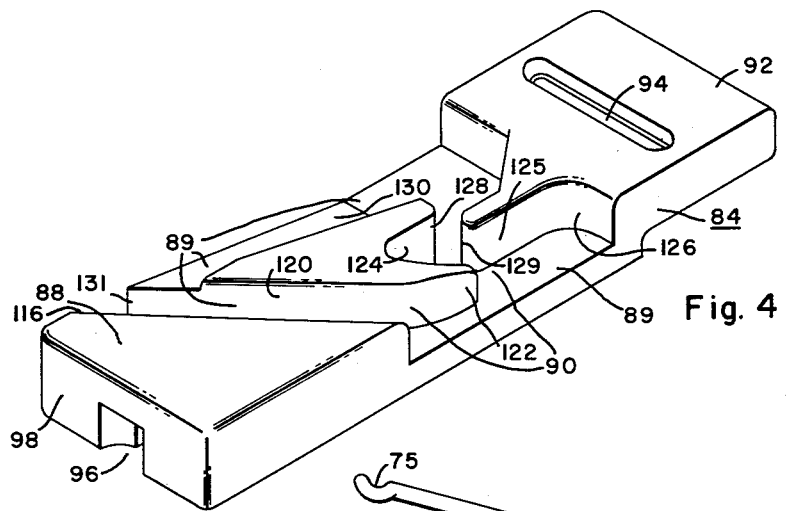
Fig. 4
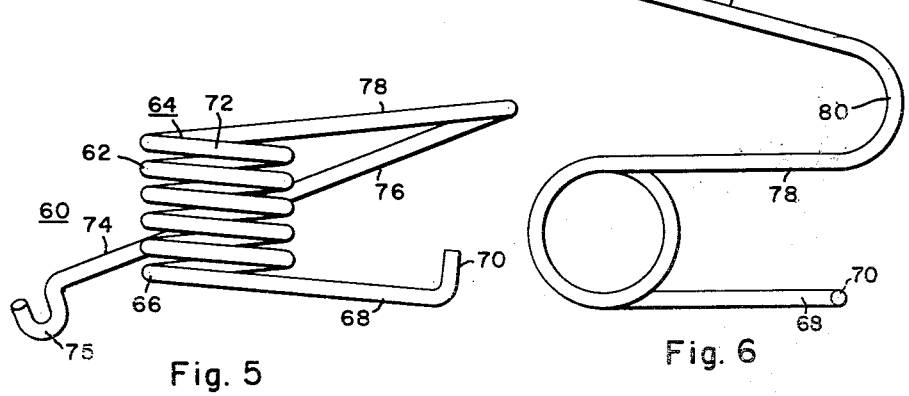
Fig. 5
Fig. 6

Jan. 23, 1962   E. BULLIS, JR   3,018,342
CIRCUIT INTERRUPTING MEANS FOR A WIRING DEVICE
Filed Oct. 9, 1959   4 Sheets-Sheet 3

United States Patent Office 3,018,342
Patented Jan. 23, 1962

3,018,342
CIRCUIT INTERRUPTING MEANS FOR A WIRING DEVICE
Earl Bullis, Jr., Fairfield, Conn., assignor to Westinghouse Electric Corporation, East Pittsburgh, Pa., a corporation of Pennsylvania
Filed Oct. 9, 1959, Ser. No. 845,349
11 Claims. (Cl. 200—51.16)

The present invention relates to electrical wiring devices, and more particularly to wiring devices that are adapted for electrically and mechanically engaging load apparatus and that are additionally provided with circuit interrupting means.

In many instances, it is desirable to provide a wiring device adapted for controlling the transmission of electrical energy therethrough by circuit interrupting means. Parenthetically, such a wiring device operates to make and break a connection with a supply of electrical energy as distinguished from one that operates or functions merely to transmit electrical energy. When a wiring device is constructed in a manner similar to that of the incandescent lampholder illustrated and described in a copending application of E. Bullis, Jr., Serial No. 824,616, entitled Wiring Device, filed July 2, 1959, and assigned to the present assignee, the circuit interrupting means conventionally is operated by forcing an actuating member unidirectionally for both opening and closing the interrupter. The mode of operation just described is often accomplished with the use of a chain member which, when first pulled actuates the circuit interrupter to provide one circuit state, either open or closed, and, when pulled a second time, actuates the circuit interrupter to provide the opposite circuit state. Successive pulls on the chain continue to actuate the circuit interrupting means alternately to provide the first and second circuit states.

Since durability and economy of construction are desirable requisites for the type of circuit interrupting means just described, in the interest of advancing the pertaining art a simplified assembly is to be provided for the construction of the interrupting means, while technical operational characteristics are in no way to be impaired by any economy of construction. The preceding general considerations have been set forth the provide a more complete understanding of the invention which will subsequently be described in more detail.

Thus, it is an object of the invention to provide novel means for circuit making and interruption in a wiring device. More specifically, an object of the invention is to provide circuit means of the character described having a minimum of component parts.

It is another object of the invention to provide a novel wiring device having a circuit interrupter that is actuated both to opened and closed positions by unidirectional forces exerted upon an actuating member and that is stabilized in those positions by means of a unique indexing relationship between the actuating member and a movable contact member of the circuit interrupter.

It is a further object of the invention to provide an incandescent lampholder in which a circuit interrupter of the type under consideration is utilized to control a supply of electrical energy to a lamp engaged with the lampholder.

These and other objects of the invention will become more apparent upon consideration of the following detailed description of an illustrative embodiment of the invention as related to the accompanying drawings, in which:

FIG. 3 is an elevational view of the lampholder taken along the reference line III—III of FIG. 1;

FIG. 4 is an enlarged isometric view of a slider or actuator for a circuit interrupter shown assembled with the lampholder of FIG. 1;

FIG. 5 is an enlarged elevational view of spring means utilized for accomplishing a circuit interruption in the lampholder of FIG. 1;

FIG. 6 is a top plan view of the spring means shown in FIG. 5;

Figure 1:
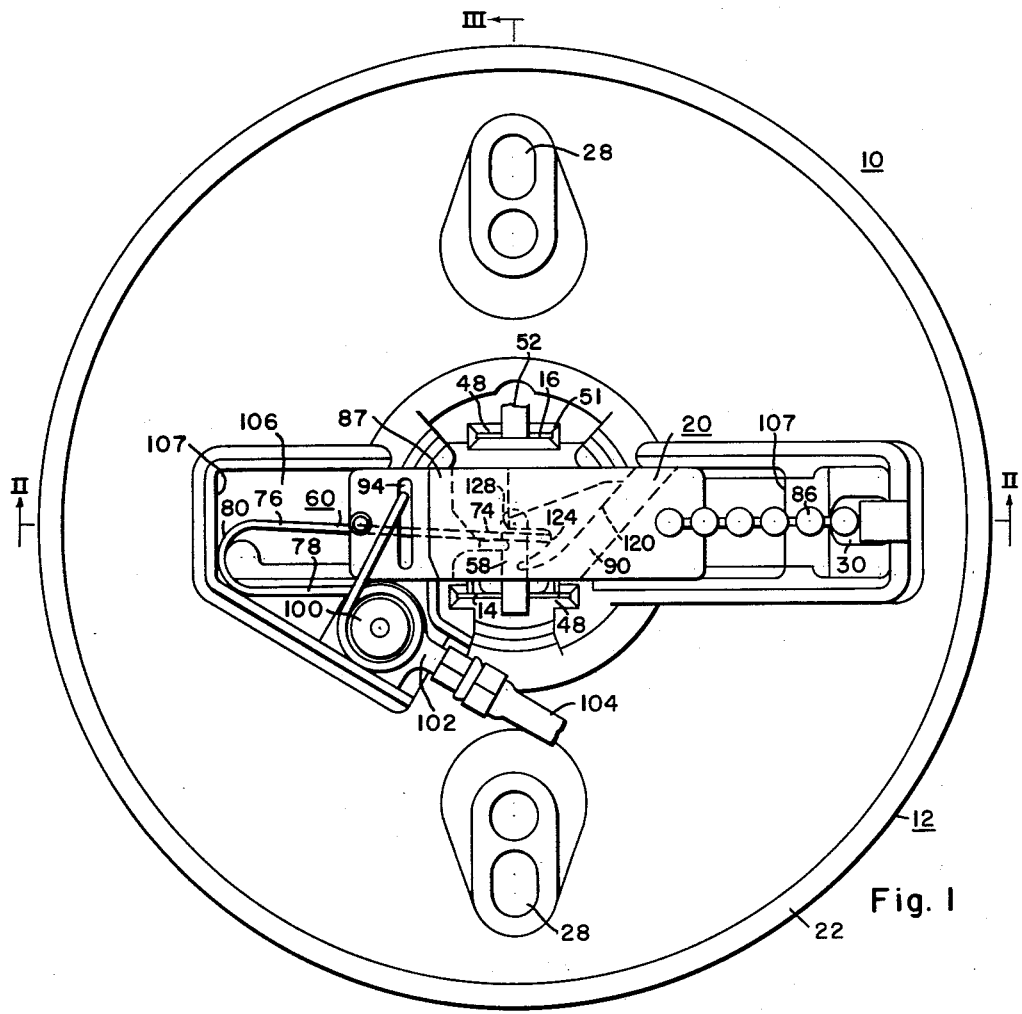
FIGURE 1 is a bottom plan view of a lampholder constructed in accordance with the principles of the invention.

With regard to the broad principles of the invention, a wiring device includes circuit interrupting means operated to on and off positions by unidirectional forces through cam action of an actuator against movable contact means. The mechanical elements of the circuit interrupting means are readily assembled to provide durable operation with technical characteristics including those conventionally provided in circuit controlling arrangements such as a rapid break, and in certain cases a rapid make, of circuit contact means upon actuation of the circuit interruption means. It is intended that the illustrative embodiment be only exemplary of the present invention for modified embodiments will readily occur to those skilled in the art of the invention.

Accordingly, the detailed description will now be set forth. With references to FIGS. 1, 2 and 3, a lampholder 10 comprises a base 12 integrally molded from an insulating material, such as white urea (or phenolic), for support of threaded load apparatus (not shown) such as an incandescent lamp, terminals 14, 16 for transmission of electrical energy from power wires to the lamp, a shell 18 of conductive material functioning as means for threadedly engaging the lamp, and a circuit interrupter 20 supported in the lampholder base 12 for making an electrical connection or for controlling the continuity between one power wire 104 and the terminal 14. The concepts related to the structure and operation of the lampholder 10, illustrated here only to point out the present invention, are fully covered in the previously mentioned copending application.

The circuit interrupter 20 of the present invention is embodied in the lampholder 10 to provide what is known as pull chain operation for lampholders of the type now under consideration. Construction of the physical elements of the illustrated embodiment of the invention is accomplished through well known manufacturing methods such as molding, stamping, and forming.

The previous comments made with regard to the broad applicability of the principles of the present invention in the field of wiring devices will become more apparent as the description continues, and, accordingly, a brief yet concise account of the structure and operation of the base 12 and the shell 18 (here in the form of a spring) will be sufficient for the purpose of pointing out the principles of the invention as embodied in the lampholder 10. The mentioned copending application, of course, is to be used as a reference for a more thorough account of those portions of the lampholder 10 here abbreviated in description.

It is to be noted that the assembled lampholder 10 has a symmetrical design to provide an appearance that accords with techniques of interior decorating and, additionally, with a generally accepted precept of the engineering profession which directs that a product of engineering effort be provided with an external appearance not disclosing any internal or intrinsic complexity of operation of the product. Thus, the base 12 includes a generally circular footer 22 and a circular projecting portion 24 in which an inner socket 26 is formed for the reception of the mentioned incandescent lamp. Openings 28 are provided in the footer 22 for passing of fasteners for mounting the lampholder 10 on a suitable support (not shown) and an additional opening 30 is provided for passage of a chain, for example to operate, upon being pulled, the circuit interrupting means 20 of the lampholder 10.

An inner surface 32 of a cylindrical wall 34 of the projecting portion 24 which defines the socket 26 is provided with integral, projecting screw thread sections 36 for guidance and engagement of the threaded base of the aforementioned lamp. Beneath the thread sections 36 is an integral ledge 38 extending helically about the wall surface 32 for approximately one turn toward a floor 40 of the projecting portion 24. Upon the helical ledge 38 is seated or stably positioned an upper coil 42 of the spring shell 18 which is constructed of resilient and conductive wire spirally formed into coils 44 including the upper coil 42. The upper coil 42 of the shell 18 is largest in diameter and the lower coil or coils 44 are provided with a smaller diameter. Additionally, the end of the upper coil 42 of the spring shell 18 is transversely deformed from the plane of the upper coil 42 so that an elongated arm 46 is extended downwardly toward the floor 40 of the projecting portion 24. Upon guidance of the threaded lamp into the socket 26, and therefore engagement of the lamp with the sections 36, the spiraled coils 44 of the spring shell 18 effect a strong electrical and mechanical engagement of the threaded base of the lamp with the lampholder 10. The elongated arm 46 of the spring shell 18 then provides an electrical connection for the threaded shell of the lamp base with the terminal 16 adjacent the floor 40 of the projecting portion 24.

The terminals 14, 16 are attached to the base 12 of the lampholder 10 through slots 48 in the floor 40 of the projecting portion 24. The terminal 16, as shown in FIG. 3, has a cantilever arm 50 which is formed for frictional engagement with the elongated spring shell arm 46. An under portion 51 (FIG. 1) of the floor 40 is abutted by a portion of the terminal 16, positioned in the corresponding slot 48, so that staking of the terminal 16 against an upper portion 53 (FIG. 3) of the floor 40 provides a firm engagement of the terminal 16 with the lampholder base 12. Additionally, an end 52 of the terminal 16 is provided with means for engaging a power wire 103, for example fingers 54 for clamping the wire 103. As mentioned in the referenced copending application, however, any of a wide variety of wire engaging means can be utilized, for example the automatic wire engaging means disclosed in a second copending application of S. A. Mason, filed July 10, 1959, entitled Quick Wiring Device, Serial No. 826,172 and assigned to the present assignee.

Figure 7:
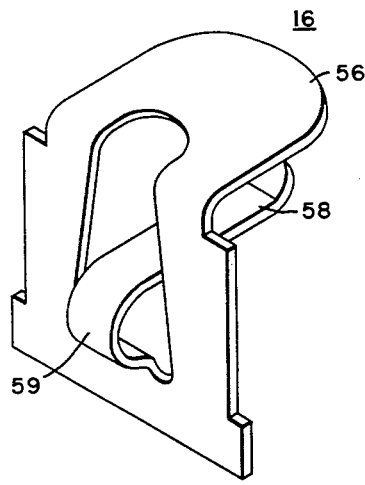
FIG. 7 is an enlarged isometric view of a terminal used with the lampholder of FIG. 1.

As readily observed, the terminal 16 operates as one contact through the spring shell 18 for an inserted lamp, while the other terminal 14 operates as a second contact for the lamp. The terminal 14 (FIG. 7) is attached to the base 12 of the lampholder 10 in a manner similar to that described for the terminal 16. Thus, the terminal 14 is located in its corresponding slot 48 and stabilized in that position by staking. However, certain differences in the structure of the terminal 14 adapt it for use with the circuit interrupter 20.

As shown in FIG. 3, an elongated cantilever tab 56 is extended toward the central axis of the lampholder socket 26 for electrical connection to a centrally located contact of an inserted lamp. An intermediate tab 58 of the terminal 14 is formed with a bight portion 59 providing added force for resilient engagement of the tab 58 with movable contact means of the circuit interrupter 20 to be more fully described hereinafter. Thus, a lamp inserted in the lampholder socket 26 is provided with a fixed electrical connection through the spring shell 18 and the terminal 16 to the power wire 103, while a second or central electrical connection to the power wire 104 through the terminal 14 can be made or interrupted by actuation of the circuit interrupter 20.

Pursuant to the present invention, the circuit interrupter 20 includes contact means 60 (FIGS. 1, 5, 6) which can be actuated to establish an electrical connection between the power wire 104 and the terminal 14. The actuation of the contact means 60 either to make or break the mentioned connection is accomplished by a unidirectional application of actuating forces upon an actuator 84. As will become apparent hereinafter, the overall arrangement of the circuit interrupter 20 is one which operates in accordance with a unique combination of physical principles.

The contact means 60 of the circuit interrupter 20 is formed from resilient conductive wire as illustrated in FIGS. 5 and 6. A portion of the contact means 60 is spirally formed into successive coils 62 to form a coil spring 64 to provide torsional spring forces for employment during the operation of the circuit interrupter 20. The bottom coil 66 of the coil spring 64 is extended laterally to form a cantilever arm 68, of which the free end 70 is deformed transversely for engagement with the actuator 84 in a manner to be subsequently described. The top coil 72 of the coil spring 64 is also extended laterally to form a contact arm 74. As illustrated in FIGS. 5 and 6, the contact arm 74 is provided with what is substantially a U-shape. However, a forearm portion 76 of the contact arm 74 is deformed downwardly from the plane of an upper arm 78 and a bight portion 80 of the contact arm 74 to provide cantilever spring forces in the operation of the circuit interrupter 20 in a manner also to be described hereinafter.

In order to control the operation of the circuit interrupter 20 in the lampholder 10, the actuator 84 is provided to enable the contact means 60 to be moved into and out of engagement with the lampholder terminal 14. Thus, the actuator or slider 84 is constructed for cooperating with the contact means 60 so as to provide the circuit interrupting feature for the lampholder 10. Additionally, a member 86, such as a chain, is extended from one end of the slider 84 so that the circuit interrupter 20 can be operated from locations apart from the vicinity of the slider 84.

Considering the structure of the slider 84 in more detail, it is to be noted that the slider 84 is generally slab-like in appearance and, further, that it is formed from an insulating material. An upper side 88 of the slider 84 is provided with structure for actuating the contact means 60. In the illustrated embodiment (FIG. 4), this structure is in the form of cam surfaces 89 along cut out portions 90 open through the slider side 88. The reactionary forces generated by the cam surfaces 89 during operational movement of the slider 84 actuate the biased contact means 60 into and out of engagement with the terminal 14 of the lampholder 10. A more thorough description of the presently embodied operation will be presented later.

One end 92 of the slider 84 is provided with a slot 94 for cooperative engagement with the cantilever arm 68 in providing forces to bias the slider toward one stable position. Although, as described, the arm 68 can be integral with the contact means 60, it will be readily observed that the slider 94 can be operated equally well if the arm 68 is a separate element. Additionally, the member or chain 86 is engaged with the slider 84 through an opening 96 in another end 98 of the slider 84.

To this point in the description, attention has been directed for the most part toward the structural aspects of the embodied elements of the invention. Before explaining the operation of the invention, it will be necessary to indicate the manner in which the structural elements are assembled to provide that operation.

As a first step in the assembly, the terminals 14, 16 can be assembled with the base 12 for firm engagement with the lampholder 10 in a manner fully described in the mentioned copending Bullis application. Generally, the central terminal 14 is engaged with the base 12 of the lampholder 10 through its corresponding slot 48 so that the intermediate cantilever tab 58 is positioned for cooperative engagement with the contact means 60 of the circuit interrupter 20. The other terminal 16 is engaged with the lampholder base 12 through its corresponding slot 48 in a position for engaging the spring shell arm 46.

The spring shell 18 is inserted into the socket 26 of the lampholder 10 in a manner also described in the mentioned copending application, and, when finally positioned, the end 50 of the terminal 16 is deformed to engage frictionally and electrically the downwardly extending arm 46 of the spring shell 18.

With completion of the portion of the assembly procedure thus far described, the circuit interrupter 20 can next be inserted in the lampholder 10. This is accomplished by first positioning a terminal device 102, to which the power wire 104 is clamped, over a terminal post 100 projecting downwardly from the base 12. The coils 64 of the contact means 60 are then placed over the terminal post 100 on the terminal device 102 so the coils 64 are compressed to effect an electrical connection between the lampholder terminal 14 and the contact means 60.

Figure 2:
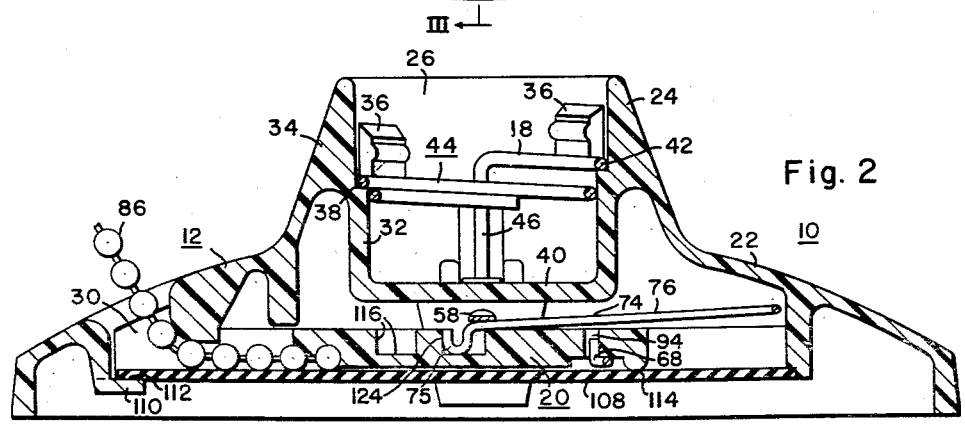
FIG. 2 is an elevational view of the lampholder taken along the reference line II—II of FIG. 1.

The underside of the base 12 is provided with a generally rectangularly faced opening 106 for receiving the slider 84. As illustrated in FIG. 1, the slider 84 is positioned in the opening 106 for longitudinal movement therein with opposite ends 107 of the opening providing, in some applications, limits of travel. In positioning the slider 84 in the base opening 106, the bearing portion 75 of the contact arm 74 is positioned adjacent to or is engaged with cam surfaces 116 of the cutout portions 90, and, additionally, the cantilever arm 68 of the contact means 60 is positioned with respect to the slider 84 so that the arm portion 70 passes through the slot 94 from the slider side 87 (FIG. 1) opposite the slider side 88 (FIG. 4). The member or chain 86, being engaged with the slider 84 through the slider opening 96, is extended from the slider 84 through the opening 30 in the lampholder base 12 for external accessibility, as shown in FIG. 2.

Figure 8:
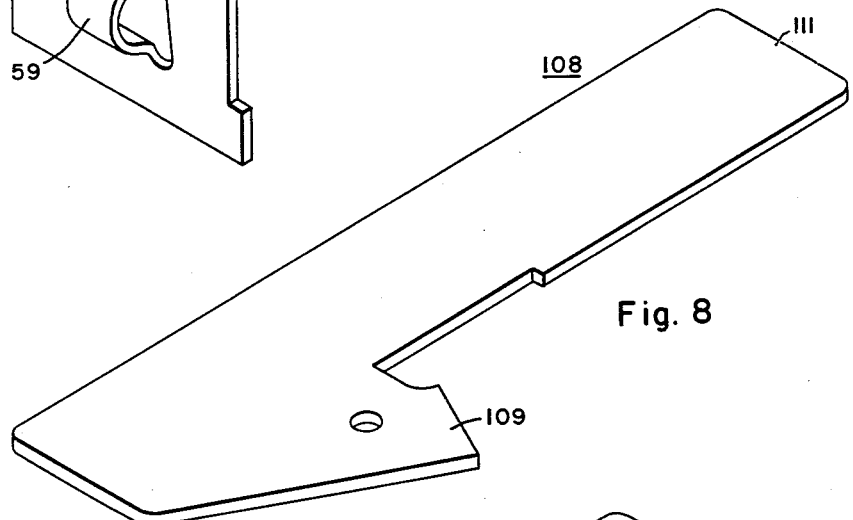
FIG. 8 is an enlarged isometric view of a cover used to close the underside of the lampholder of FIG. 1.

A cover 108 (FIG. 8) is provided to contain the circuit interrupting arrangement within the lampholder 10. The cover 108 generally conforms with the underside base opening 106 in order to enclose the same and is formed from an insulating material. As shown in FIG. 2, a laterally projecting portion 110 of the base 12 provides a ledge 112 upon which one cover end 111 is positioned while the other end of the cover 108 is secured to the base by means of a fastener (not shown). Since both ends of the cover 108 are therefore secured against withdrawal forces, a firm engagement of the cover 108 with the base 12 is accomplished.

An additional point to observe is that the innerside of the cover 108 engages a roller portion 114 of the slider 84 (FIG. 2) and the curved surfaces of the actuating member or chain 86 to retain the slider 84 against the base 12 while providing for longitudinal movement of the slider 84 within the base 12 with a minimum amount of wear through friction. It is to be further noted that a portion 109 of the secured cover 108 bears against and compresses the coils 64 of the contact means 60 to effect the aforementioned electrical connection between the terminal device 102 and the contact means 60.

Figure 10:
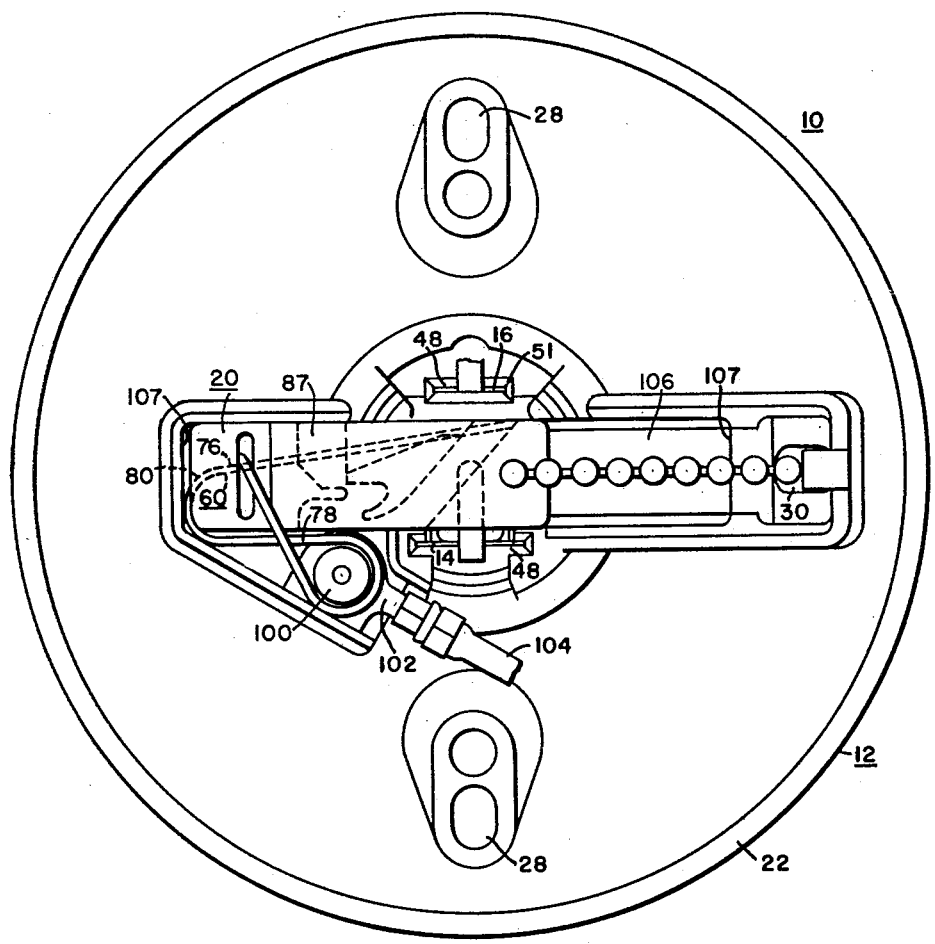

The operation of the circuit interrupter 20 will now become more apparent. In the interrupted position of the circuit interrupter 20, the slider 84 is positioned, as viewed in FIG. 10, to the far left of the base 12 as a result of the spring bias forces of the cantilever arm 68. At this position, the arm 74 of the contact means 60 is biased so that a bearing portion 75 thereof is either tolerantly spaced from or bearingly abuts cam surfaces 116 (FIGS. 2 and 10) of the slider 84 and so that the arm 74, being spring forced inwardly toward the plane of the arm 78 and the bright portion 80 of the contact means 60, is held slightly inwardly to be biased away from the coil spring 64 of the contact means 60. Upon actuation of the slider 84 through pulling forces exerted on the chain 86 as viewed in FIG. 1, the slider 84 is forced to the right, against bias forces of the cantilever arm 68 which forces increase substantially in proportion to the progressive movement of the slider 84, to move the contact arm 74 inwardly toward the coil spring 64 in a manner such that the bearing portion 75 is guided along the cutout portion 90 against the cam surface 120. Continued motion of the slider 84 in the aforementioned direction, of course, additionally causes the spring bias forces of the contact arm 74 to increase considerably.

When the slider 84 has been moved to a position where the contact arm 74 is biased against an end portion 122 of the cam surface 120, a further slight amount of motion of the slider 84 causes the contact arm 74 to snap to the left, as viewed in FIG. 4, against a cam surface 125 in consequence of the previously mentioned bias forces of the contact 74. Upon release of the chain 86, the biased cantilever arm 68 then forces the slider 84 to withdraw to the left (FIG. 1) so that the bearing portion 75 of the arm 74 cams into an engaged and indexed position against a detent cam surface 124.

At this point, it should be noted that a cam surface 126 is provided in the slider 84 to provide a limit of movement for the slider 84, although with manufacturing tolerances the ends 107 of the opening 106 may provide the limits for slider travel, in the event the chain 86 is not released when the slider 84 has been moved to the point where the contact forearm 74 snaps to a biased position against the cam surface 125. Thus, the cam surface 126 provides an indication for releasing the chain 86 and, upon release of the chain 86, additionally guides the contact arm 74 into a camming relationship with the cam surface 125 for guidance into the indexed position against the detent cam surface 124. Further, in order to ensure guidance of the arm 74 into engagement with the detent cam surface 124, an end portion 128 of the surface 124 extends beyond the lateral plane which includes an edge 129 of the cam surface 125.

Because the slider 84 is biased to the left (FIG. 1), the contact arm 74 is stably positioned or indexed, as previously noted, against the detent cam surface 124 at this point in the operation of the circuit interrupter 20. Inasmuch as the intermediate cantilever tab 58 of the lampholder terminal 14 is extended to a position (FIGS. 1 and 2) above and adjacent the slider detent cam surface 124, the indexing of the contact arm 74 against the detent cam surface 124 affords an engagement of the contact arm 74 with the terminal tab 58 through spring forces exerted by the terminal tab 58 on the movable contact arm 74 in the mentioned indexed position. It is to be observed that the making of the connection between the movable contact arm 74 and the terminal tab 58 is one which arises with a wiping action.

Upon reactuation of the slider 84 by a second pull on the chain 86 to the right, as viewed in FIG. 1, the bias forces of the contact arm 74 cause the contact arm 74 to cam to an end portion 128 of the detent cam surface 124. Upon passing beyond the end portion 128 of the detent cam surface 124, the contact arm 74 breaks its engagement with the terminal tab 58 with a snap action caused by the bias forces of the contact arm 74. Subsequent release of the chain 86 permits the slider to return to its original position as a result of the bias or return forces of the cantilever arm 68 so that the contact bearing portion 75 passes along upgraded cam surface 130 to its first indexed position either adjacent to or against the slider cam surfaces 116 when the slider 84 is finally stationed. The cam surface 130 is upgraded, of course, so as to guide the bearing portion 75 into its first indexed position while still providing an upstanding portion 131 of the cam surface 120 for operation of the interrupter 20 as previously described.

It is thus apparent that the slider 84 operates as means for actuating the contact arm 74 into and out of engagement with the tab 58 of the terminal 14. The actuation of the contact arm 74 is facilitated through the utilization of cam forces against the bearing portion 75 which cams along the described surfaces during movement of the slider 84. In addition to both forcing the contact arm 74 into engagement with the terminal tab 58 and releasing the contact arm 74 from that engagement, the slider 84 effects an indexing of the contact arm 74 in the make and the break positions of the interrupter 20. Consideration of these principles of the invention therefore indicates that the specific structure accorded to the cam surfaces 90 of the slider in FIG. 4 is not to be construed as a limiting feature of the invention, for other cam surfaces providing cam forces similar to those considered here can readily be constructed without departing from the spirit of these principles.

Figure 9:
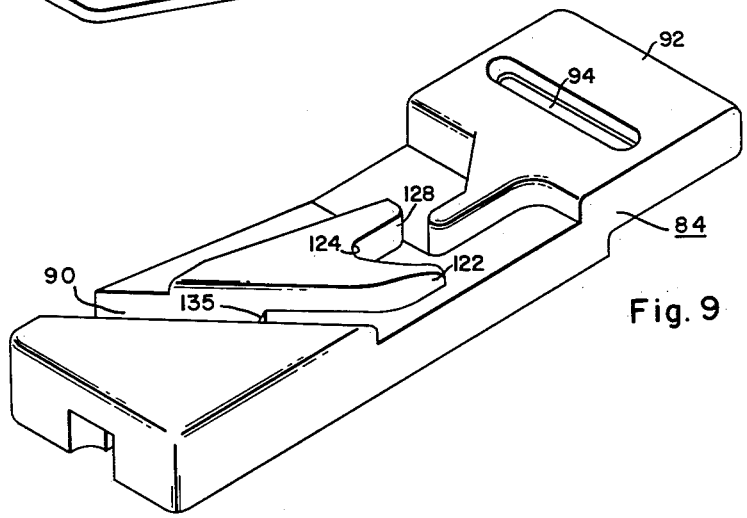
FIG. 9 is a partial isometric view of a modification of the actuator of FIG. 4; and, FIG. 10 is a view similar to FIG. 1, with the circuit interrupter being shown in an "off" position.

For example, multiple indexed positions can be embodied for movable contact means when multiple spaced stationary contacts are provided in modified interrupters under the combination of physical principles disclosed here. Additional cam surfaces can also be embodied to perform added functions, such as a provision for a snap making of engagement between contacts as well as a snap breaking. The latter provision can be provided through the use of an upstanding cam surface 135 (FIG. 9) located in the cutout portion 90. When the bearing portion 75 is cammed against the cam surface 135, continued pulling of the slider 84 results temporarily in storing energy in the forearm 76 rather than continued camming of the bearing portion 75 along the cutout portion 90. Then the bearing portion 75 cams upwardly along the surface 135 and snaps along the cutout portion 90 into engagement with the tab 58 of the terminal 14. The bearing portion 75 is indexed, of course, in this engaged position in the manner previously described.

When the lampholder 10 is placed in use, an electric lamp, as previously suggested, can be threaded into the lampholder socket 26. The terminal 16 then is electrically connected with the shell of the electric lamp base through the spring shell 18, and the central contact 14 being deformed at a point indicated by the reference character 132 engages a central contact of the electric lamp under the effect of cantilever spring forces of the tab 56. Operation of the circuit interrupter 20 in the manner previously described can then control the supply of electrical energy to the lamp.

Although the circuit interrupter of the present invention has been described in combination with other elements to comprise a lampholder, it should be obvious that by no means is the application of the circuit interrupter to be limited to a lampholder. Without departing from the principles of the present invention, slight design or structural changes can accommodate the circuit interrupter for use in any wiring device where circuit interruption with the advantages provided by the present invention is desired. The illustrative embodiment, accordingly, is only exemplary of the present invention and it is therefore desired that the invention be accorded an interpretation not limited by the illustrative embodiment but only by the scope and spirit of its broad principles.

What is claimed is:

1. A wiring device comprising a housing of insulating material, a terminal being supported relative to said housing, circuit interrupting means positioned for operation in said housing, said interrupting means including movable contact means, and cam means for actuating said movable contact means into and out of engagement with said terminal, said contact means being biased toward one position and said cam means being movable in one direction both to effect movement of said contact means into a second position and return of the same to said one position, said terminal being electrically engaged with said contact means in one of said positions, and means for biasing said cam means in the direction opposite said one direction.

2. A wiring device comprising an insulating housing and means for forcibly moving a contact located therein, an elongated terminal member being supported adjacent one end relative to said housing and having a first cantilever arm extending from the other end thereof for resilient engagement with load apparatus, said terminal member additionally having a second cantilever arm extending from an intermediate portion thereof for resilient engagement with said contact, whereby an electrical connection can be established between said contact and said load apparatus when said contact is moved into engagement with said second cantilever arm.

3. A wiring device comprising an insulating housing and means for forcibly moving a contact located therein, an elongated terminal member being supported adjacent one end relative to said housing and having a first cantilever arm extending from the other end thereof for resilient engagement with load apparatus, said terminal member additionally having a second cantilever arm extending from an intermediate portion thereof for resilient engagement with said contact, said second cantilever arm having a first portion extending from one side of said terminal member and a second portion contiguous with said first portion extending reversely through the plane of said terminal member to project from the side of said terminal member opposite said one side so that said second cantilever arm responds to bear against said contact with mechanically multiplied force when said contact is moved into engagement with said second portion of said second cantilever arm.

4. A wiring device comprising an insulating support, a circuit interrupter and terminal means mounted relative to said support, said interrupter including spring means having a movable contact arm extended from one portion thereof and having a resilient cantilever arm extended from another portion thereof, an actuating member positioned adjacent said spring means for movement relative thereto, said cantilever arm engaging said actuating member to bias the same toward one position, said movable contact arm bearing with spring force against said actuating member, said actuating member camming said contact arm into an indexed and biased engagement with said terminal means when moved in a direction away from said one position to a second position, said contact arm being released from said indexed engagement when said actuating member is further moved in said direction away from said one position, and said cantilever arm being effective to return said actuating member to said one position when said contact arm is so released.

5. A wiring device comprising an insulating support, a circuit interrupter and terminal means mounted relative to said support, said interrupter including spring means having an elongated resilient contact arm extending from one portion thereof and having an elongated cantilever arm extending from another portion thereof, an actuating member positioned adjacent said spring means for movement relative thereto, said cantilever arm having a transverse end portion thereof engaging said actuating member to bias the same toward one position, said resilient contact arm having a transverse end portion positioned relative to said actuating member so that indent surfaces of said actuating member are operable to cam said transverse end portion of said resilient contact arm to an indexed and biased engagement with said terminal means when said actuating member is moved in a direction away from said one position to a second position, and said actuating member releasing said resilient contact arm from said indexed engagement when said actuating member is further moved in said direction away from said one position, and said cantilever arm being effective to return said actuating member to said one position when said contact arm is so released.

6. A wiring device comprising a housing of insulating material having an open side, terminal means being supported relative to a portion of said housing, movable contact means mounted relative to said housing, means for biasing said movable contact means toward one position, cam means for actuating said contact means from said one position to a second indexed position, said cam means including an actuating member operable to urge said contact means into said second position in opposition to the biasing forces of said biasing means, said actuating member being operable to release said contact means from said second indexed position for repositioning in said first position in response to said bias forces of said biasing means, and a closure member secured to enclose the open side of said housing and to hold said actuating member in said housing, said contact means in one of said positions engaging said terminal means.

7. A wiring device comprising a housing of insulating material, terminal means being supported relative to said housing and having a first cantilever arm extended from one end thereof for resilient engagement with load apparatus, said terminal means additionally having a second cantilever arm extended from an intermediate portion thereof, circuit interrupting means positioned for operation in said housing, said interrupting means including movable contact means and cam means for actuating said contact means into and out of engagement with said second cantilever arm of said terminal means, means for biasing said contact means toward one position, said cam means being operable to cam said contact means to a second indexed position, said contact means engaging said second cantilever arm in one of said positions.

8. A wiring device comprising terminal means mounted relative to an insulating support thereof, spring means mounted relative to said support, said spring means having a contact arm extended therefrom, an actuating member having an irregularly contoured guide means on one side thereof, means for biasing said actuating member toward one position, said contact arm having a portion thereof positioned against said guide means of said actuating member in a first indexed station, said contact arm portion being urged to a second indexed and biased station against said guide means when said actuating member is moved in a direction away from said one position to a second position, said portion of said contact arm being released from said second indexed station when said actuating member is further moved in said direction away from said one position, said terminal means being engaged with said contact means in one of said indexed stations.

9. A wiring device comprising terminal means mounted relative to a support thereof, spring means mounted relative to said support, said spring means having a contact arm extended therefrom, an actuating member having an irregularly contoured groove in one side thereof, means for biasing said actuating member toward one position, said contact arm having a portion thereof cooperatively engaging said actuating member in said groove in a first indexed station, first surfaces of said groove camming said portion of said contact arm toward a second indexed station in said groove when said actuating member is moved in a direction away from said one position toward a second position, said portion of said contact arm being released from said second indexed station when said actuating member is further moved in said direction away from said one position, said terminal means being engaged with said contact means in one of said indexed stations, said groove having a second surface forming a limit of movement for said actuating member with respect to said contact arm to indicate the location of said second indexed station, said portion of said contact arm springing into said second indexed station upon release of said actuating member after being limited as said in movement.

10. A wiring device comprising a housing of insulating material, terminal means being supported relative to a portion of said housing, movable contact means mounted relative to said housing and having a first position, means for biasing said movable contact means toward said first position, an actuating member mounted relative to said housing and being operable in one direction to cam slidably said movable contact means toward a second position, means for biasing said actuating member in the direction opposite said one direction, a portion of said actuating member damping the camming movement of said movable contact means for a limited interval of time during continued sliding of said actuating member, said movable contact member than snapping over said portion into rapid engagement with said terminal means and then into said second indexed position upon release of said actuating member, said movable contact means snapping away from said engagement with said terminal means in response to said bias forces of said movable contact biasing means upon further movement of said actuating member in said one direction.

11. A wiring device comprising an insulating support, a terminal being mounted relative to said support, a spring having an elongated contact arm being mounted relative to said support, and means for controlling the electrical continuity between said terminal and said contact arm, said controlling means including a cam actuator being movable in one direction to move said contact arm into biased engagement with said terminal and being further movable in said one direction to enable said contact arm to be disengaged from said terminal, and means for biasing said actuator in the direction opposite said one direction.

References Cited in the file of this patent
UNITED STATES PATENTS 2,226,772   Johnson _____ Dec. 31, 1940

FOREIGN PATENTS 138,728   Great Britain _____ Feb. 19, 1920